(12) United States Patent
Abdallah, Jr.

(10) Patent No.: US 11,724,539 B2
(45) Date of Patent: Aug. 15, 2023

(54) TIRE RIM ASSEMBLY HAVING INNER AND OUTER RIM COMPONENTS

(71) Applicant: Bridgestone Americas Tire Operations, LLC, Nashville, TN (US)

(72) Inventor: David G. Abdallah, Jr., Nolensville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 218 days.

(21) Appl. No.: 17/285,553

(22) PCT Filed: Oct. 23, 2019

(86) PCT No.: PCT/US2019/057515
§ 371 (c)(1),
(2) Date: Apr. 15, 2021

(87) PCT Pub. No.: WO2020/101844
PCT Pub. Date: May 22, 2020

(65) Prior Publication Data
US 2021/0387476 A1  Dec. 16, 2021

Related U.S. Application Data

(60) Provisional application No. 62/767,234, filed on Nov. 14, 2018.

(51) Int. Cl.
*B60B 25/00* (2006.01)
*B60C 7/24* (2006.01)
(Continued)

(52) U.S. Cl.
CPC ............ *B60B 25/006* (2013.01); *B60B 21/10* (2013.01); *B60C 7/24* (2013.01); *B60C 7/18* (2013.01)

(58) Field of Classification Search
CPC .. B60C 7/18; B60C 7/14; B60C 7/143; B60C 7/146; B60C 7/107; B60C 7/24;
(Continued)

(56) References Cited

U.S. PATENT DOCUMENTS 876,537 A * 1/1908 Garchey ................. B60B 9/005
16/45
1,336,452 A  4/1920 Wheelock
(Continued)

FOREIGN PATENT DOCUMENTS

BE   338574 A   1/1927
CA   2261492   7/2000
(Continued)

OTHER PUBLICATIONS

European Search Report; Corresponding European Application Serial No. 19885611.4; dated Jul. 4, 2022.
(Continued)

*Primary Examiner* — Kip T Kotter
(74) *Attorney, Agent, or Firm* — Shaun J. Fox; Bryan J. Jaketic

(57) ABSTRACT

A rim assembly for a tire includes an outer rim having an outer annular surface and an inner surface. The rim assembly also has an inner rim with an outer surface, wherein the inner surface of the outer rim has a first plurality of axial grooves that define a first plurality of axial ridges. The outer surface of the inner rim has a second plurality of axial grooves that define a second plurality of axial ridges. The second plurality of axial grooves have a cross-sectional geometry corresponding to a cross-sectional geometry of the first plurality of axial ridges, and the second plurality of axial ridges have a cross-sectional geometry corresponding to a cross-sectional geometry of the first plurality of axial grooves.

14 Claims, 5 Drawing Sheets

(51) Int. Cl.
B60B 21/10 (2006.01)
B60C 7/18 (2006.01)

(58) Field of Classification Search
CPC ... B60B 25/002; B60B 25/004; B60B 25/006; B60B 21/10
See application file for complete search history.

(56) References Cited

U.S. PATENT DOCUMENTS

| | | |
|---|---|---|
| 1,518,746 A | 12/1924 | Meyer |
| 1,638,810 A | 8/1927 | Klaus |
| 1,669,600 A | 5/1928 | Elmer |
| 1,786,957 A | 12/1930 | Mueller |
| 4,226,273 A * | 10/1980 | Long .................. B60C 7/24 152/403 |
| 7,334,617 B2 * | 2/2008 | Hill, III ............... B60C 11/22 301/64.301 |
| 7,878,600 B2 | 2/2011 | Krantz et al. |
| 8,104,524 B2 | 1/2012 | Manesh et al. |
| 8,292,018 B2 * | 10/2012 | Huang .................. B60C 7/102 180/220 |
| 8,578,984 B2 | 11/2013 | Hannah et al. |
| 9,475,244 B2 | 10/2016 | Williams et al. |
| 9,511,631 B2 | 12/2016 | Fudemoto et al. |
| 9,511,632 B2 | 12/2016 | Fudemoto et al. |
| 2009/0211677 A1 | 8/2009 | Palinkas et al. |
| 2012/0048636 A1 * | 3/2012 | Huang .................. B62K 3/002 301/6.5 |
| 2015/0224825 A1 | 8/2015 | Chen et al. |
| 2016/0089935 A1 | 3/2016 | Iwamura |
| 2018/0015785 A1 | 1/2018 | Stuckey et al. |
| 2020/0361237 A1 * | 11/2020 | Andrews ................. B60C 7/24 |

FOREIGN PATENT DOCUMENTS

| | | |
|---|---|---|
| CN | 201371709 | 12/2009 |
| CN | 101687433 | 3/2010 |
| CN | 103350615 | 10/2013 |
| CN | 106379114 | 2/2017 |
| CN | 207106046 | 3/2018 |
| EP | 0159888 | 4/1985 |
| EP | 0297628 | 1/1989 |
| FR | 466332 | 5/1914 |
| FR | 580761 | 11/1924 |
| FR | 2616352 A1 * | 12/1986 |
| FR | 3032381 | 8/2016 |
| GB | 218450 A | 7/1924 |
| GB | 221561 A | 9/1924 |
| GB | 233902 A * | 5/1925 |
| JP | S48-29921 | 9/1973 |
| JP | 2010-522666 | 7/2010 |
| JP | 2015-081005 | 4/2015 |
| JP | 2018-94825 | 6/2018 |
| KR | 10-2010-0007366 | 1/2010 |
| KR | 100998399 | 12/2010 |
| WO | 2014188912 | 11/2014 |
| WO | 2015012501 | 1/2015 |
| WO | 2016123180 | 12/2016 |

OTHER PUBLICATIONS

Written Opinion and International Search Report; corresponding PCT Application No. PCT/US2019/057515 filed Oct. 23, 2019; Authorized Officer Hwang, Chan Yoon; dated Feb. 12, 2020.

* cited by examiner

TIRE RIM ASSEMBLY HAVING INNER AND OUTER RIM COMPONENTS

FIELD OF INVENTION

The present disclosure relates to a rim assembly for a tire, the rim assembly having multiple components. More particularly, the present disclosure relates to a rim assembly for a non-pneumatic tire, the rim assembly having an inner rim component and an outer rim component.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

In current mounting methods, a non-pneumatic tire is mounted to a rim and affixed with adhesive, such that the rim it is difficult to remove the rim from the tire without causing damage to the rim or tire. If the rim is removed from the tire, it is difficult to remove any remaining adhesive from the rim. Thus, when the tire reaches its end of life, it may be resource intensive or expensive to recover the rim. As tires and tire designs become larger, the cost of the non-reusable rims will also increase.

SUMMARY OF THE INVENTION

In one embodiment, a non-pneumatic tire and rim assembly includes a non-pneumatic tire with an annular inner ring having an axis of rotation, an annular outer ring, and support structure extending between the annular inner ring and the annular outer ring. The non-pneumatic tire and rim assembly also includes a rim assembly with an outer rim having an outer annular surface and an inner surface. The inner surface of the outer rim has a first plurality of axial grooves that define a first plurality of axial ridges. The rim assembly also has an inner rim with an outer surface, wherein the outer surface of the inner rim has a second plurality of axial grooves that define a second plurality of axial ridges. The second plurality of axial grooves have a cross-sectional geometry corresponding to a cross-sectional geometry of the first plurality of axial ridges, and the second plurality of axial ridges have a cross-sectional geometry corresponding to a cross-sectional geometry of the first plurality of axial grooves.

In another embodiment, a method of assembling a tire and rim assembly includes providing a tire having an annular outer tire surface that defines an outer diameter and an annular inner tire surface that defines an inner diameter. The method further includes providing a first rim component having a first outer annular rim surface and a first inner rim surface defined by a first plurality of axial ridges and a first plurality of axial grooves. The method also includes providing a second rim component having a second outer rim surface defined by a second plurality of axial ridges and a second plurality of axial grooves. The method further includes affixing the first outer annular rim surface of the first rim component to the annular inner tire surface of the tire. The method also includes aligning the second plurality of axial ridges of the second rim component with the first plurality of axial grooves of the first rim component, and inserting the second rim component into the first rim component.

In yet another embodiment, a rim assembly for a tire includes an outer rim having an outer annular surface and an inner surface. The rim assembly also has an inner rim with an outer surface, wherein the inner surface of the outer rim has a first plurality of axial grooves that define a first plurality of axial ridges. The outer surface of the inner rim has a second plurality of axial grooves that define a second plurality of axial ridges. The second plurality of axial grooves have a cross-sectional geometry corresponding to a cross-sectional geometry of the first plurality of axial ridges, and the second plurality of axial ridges have a cross-sectional geometry corresponding to a cross-sectional geometry of the first plurality of axial grooves.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
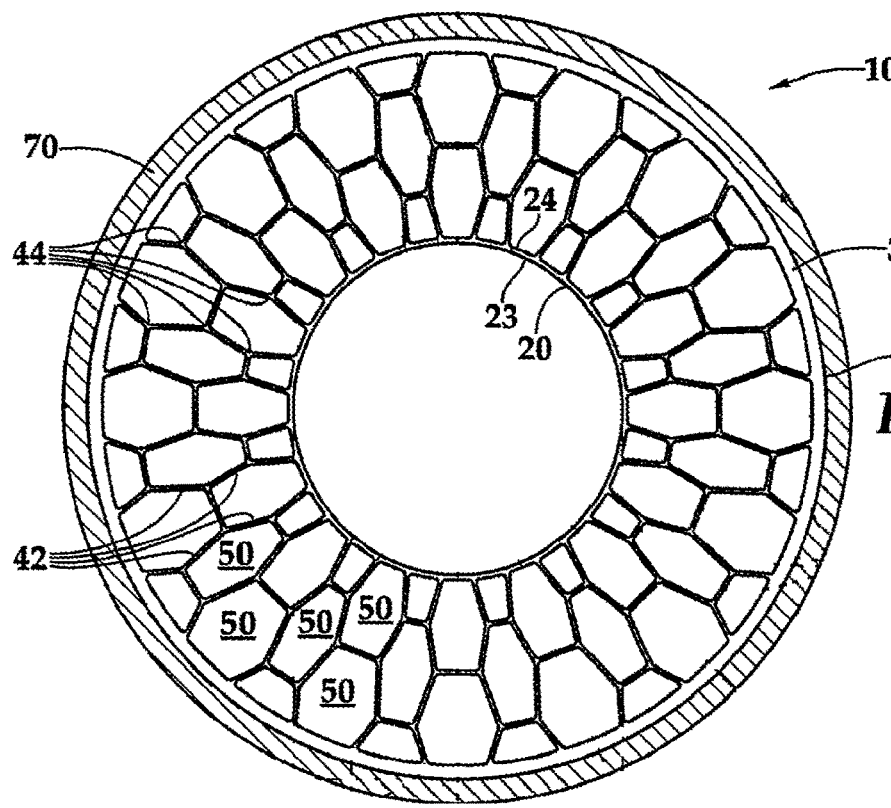
FIG. 1 is a front view of an undeformed non-pneumatic tire.
Figure 2:
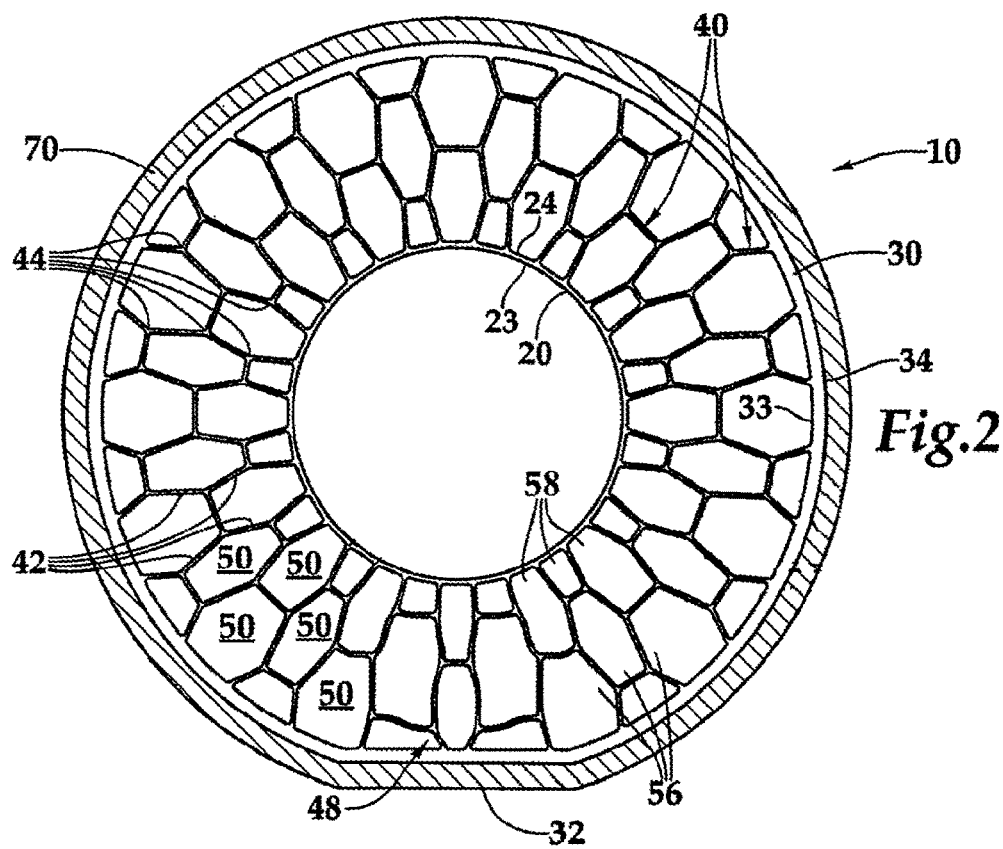
FIG. 2 is a front view of the non-pneumatic tire of FIG. 1 being deformed when subjected to a load.

FIGS. 1 and 2 illustrate one embodiment of a non-pneumatic tire 10. The non-pneumatic tire 10 is merely an exemplary illustration of a tire that may be used with a rim assembly having inner and outer components. It is not intended to be limiting.

In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of cross-linked or uncross-linked polymers. In this disclosure, the term "polymer" means cross-linked or uncross-linked polymers.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. The generally annular inner ring 20 and the generally annular outer ring 30 and the interconnected web 40 can be made by injection or compression molding, castable polymer, additive manufacturing, or any other method generally known in the art and can be formed at the same time so that their attachment is formed by the material comprising the inner ring 20, the outer ring 30 and the interconnected web 40 cooling and setting.

As shown in FIG. 1, the generally annular outer ring 30 can have a radially interior surface 33 and a radially external surface 34 to which a tread carrying layer 70 is attached. Attachment can be done adhesively or using other methods commonly available in the art.

In the illustrated embodiment, the interconnected web 40 has at least two radially adjacent layers 56, 58 of web elements 42 that define a plurality of generally polygonal openings 50 having vertices 44. In other embodiments (not shown), other web configurations may be employed. In another embodiment (not shown), spokes or other support structure may be employed instead of a web.

Figure 3:
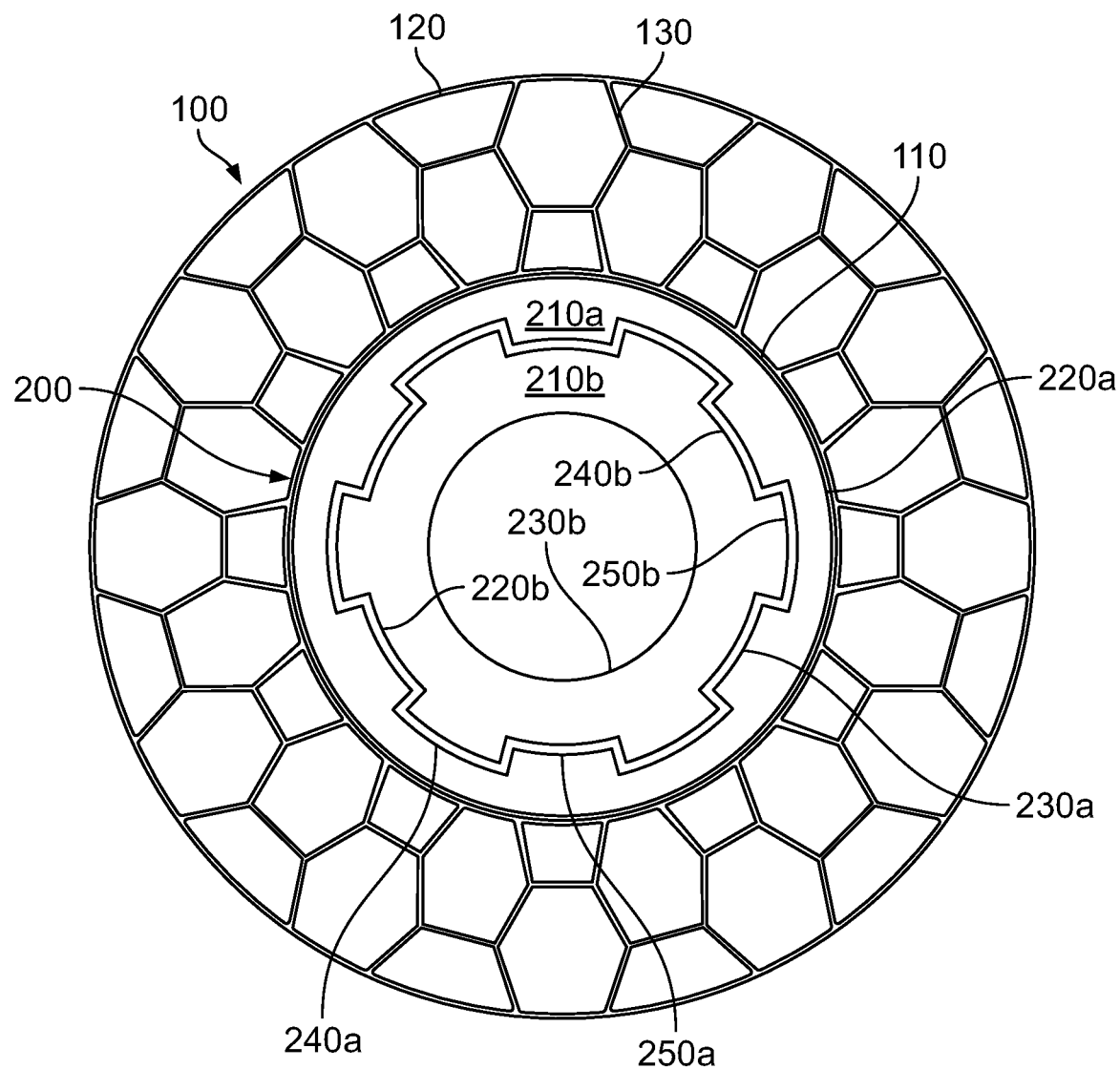
FIG. 3 is a cross-sectional view of another embodiment of an undeformed non-pneumatic tire mounted to one embodiment of a rim assembly.

FIG. 3 illustrates a front view of another embodiment of a tire 100 having a generally annular inner ring 110, a generally annular outer ring 120, and support structure in the form of a flexible, interconnected web extending between the inner ring 110 and the outer ring 120. The flexible, interconnected web is formed by a plurality of web elements 130 that define polygonal openings. In this particular embodiment, the web elements 130 form a plurality of hexagonal and substantially trapezoidal shapes, including an outer series of alternating hexagonal and trapezoidal opening and an inner series of alternating hexagonal and trapezoidal openings. It should be understood that the geometries shown in FIGS. 1-3 are merely exemplary and that any geometries may be employed. Similarly, spokes or other support structure may be employed instead of a webbing.

FIG. 3 additionally shows the tire 100 mounted on a rim assembly 200. The rim assembly 200 includes an outer rim 210*a* having an outer annular surface 220*a* and an inner surface 230*a*. The inner surface 230*a* of the outer rim has a first plurality of axial grooves 240*a* that define a first plurality of axial ridges 250*a*.

The rim assembly 200 further includes an inner rim 210*b* having an outer surface 220*b* and an inner surface 230*b*. The outer surface 220*b* of the inner rim 210*b* has a second plurality of axial grooves 240*b* that define a second plurality of axial ridges 250*b*. The second plurality of axial grooves 240*b* have a cross-sectional geometry corresponding to a cross-sectional geometry of the first plurality of axial ridges 250*a*. Likewise, the second plurality of axial ridges 250*b* have a cross-sectional geometry corresponding to a cross-sectional geometry of the first plurality of axial grooves 240*a*. Thus, the inner rim 210*b* may be axially inserted into and removed from the outer rim 210*a*.

In the illustrated embodiment, the outer rim 210*a* has six axial grooves 240*a* and six axial ridges 250*a*. The inner rim 210*b* likewise has six axial grooves 240*b* and six axial ridges 250*b*. However, it should be understood that this number of ribs and grooves is merely for illustrative purposes, and more or fewer ribs may be employed. For example, in a commercial embodiment, each inner and outer rim may have dozens or even hundreds of ribs and grooves.

FIG. 3 shows a gap between the inner surface 230*a* of the outer rim 210*a* and the outer surface 220*b* of the inner rim 210*b*. However, this gap is exaggerated for illustrative purposes. In other embodiments, the tolerance between the outer rim and the inner rim may be minimized and the inner surface of the outer rim and the outer surface of the inner rim may contact each other. A lubricant may be employed to facilitate the axial insertion and removal of the inner rim 210*b* from the outer rim 210*a*.

The annular inner ring 110 of the non-pneumatic tire 100 has a smooth inner surface with a first diameter, and the outer annular surface 220*a* of the outer rim 210*a* is a smooth surface with a second diameter. In one embodiment, the first diameter is equal to the second diameter. In an alternative embodiment, the second diameter is slightly smaller than the first diameter to provide clearance to insert the outer rim 210*a* into the annular inner ring 110 of the tire. In another alternative embodiment, the second diameter is slightly larger than the first diameter, and the outer rim 210*a* is force fit into the annular inner ring 110 of the tire.

In one embodiment, the outer annular surface 220*a* of the outer rim 210*a* is fixedly attached to the annular inner ring 110 of the non-pneumatic tire 100 by an adhesive. The materials of the annular inner ring 110, the outer rim 210*a*, and the adhesive may be selected so that a strong bond is formed at the interface, such that the annular inner ring 110 remains attached to the outer rim 210*a* when high levels of torque are applied, without deformation. For example, the inner ring 110 and the outer rim 210*a* may both be constructed of a polymeric material. The outer rim 210*a* may have a higher modulus than the inner ring 110. For example, the outer rim may be a hard plastic. In an alternative embodiment, the outer rim and the inner ring are constructed of the same material. For example, both the outer rim and the inner ring may be constructed of the same polymeric material. In another alternative embodiment, the outer rim is constructed of metal.

In an alternative embodiment, the inner ring 110 is attached to the outer rim 210*a* through a chemical bond. For example, the inner ring and the outer rim may be cured together.

In one embodiment, no adhesive is employed between the outer rim 210*a* and the inner rim 210*b*, nor is any chemical bonding or other permanent bonding method employed. Instead, the inner rim 210*b* is simply inserted into the outer rim 210*b*. The inner rim 210*b* may be maintained in its place by a force fit.

No adhesive is used to affix the outer rim 210*a* to the inner rim 210*b*. Because the outer rim 210*a* is not permanently affixed to the inner rim 210*b*, the outer rim 210*a* and tire 100 may be removed from the inner rim 210*b* for inspection, maintenance, or replacement. After the outer rim 210*a* and tire 100 are removed from the inner rim 210*b*, they may be later mounted back onto the inner rim 210*b* or a different outer rim or tire and outer rim assembly may be mounted onto the inner rim 210*b*. Thus, the inner rim 210*b* is reusable, even if the tire 100 cannot be removed from the outer rim 210*a*.

When the tire 100, outer rim 210*a*, and inner rim 210*b* are fully assembled, the inner rim 210*b* may be rotated by an axle of a vehicle, or by other means. As the inner rim 210*b* is rotated, the sides of the inner ridges 250*b* engage the sides of the outer ridges 250*a* and a torque is applied to the outer rim 210*a*. The applied torque causes the outer rim 210*a* to rotate at the same angular velocity as the inner rim 210*a*.

Because the tire 100 is fixedly attached to the outer rim 210a, the tire 100 also rotates at that same angular velocity.

In the embodiment shown in FIG. 3, the sides of the first and second plurality of axial ridges 250a,b extend in substantially radial directions. Thus each of the axial ridges 250a,b has a substantially rectangular cross-section of substantially the same size. However, it should be understood that the ridges may have various sizes and geometric shapes. Examples of some geometries are shown in FIGS. 4A-D.

Figure 4A:
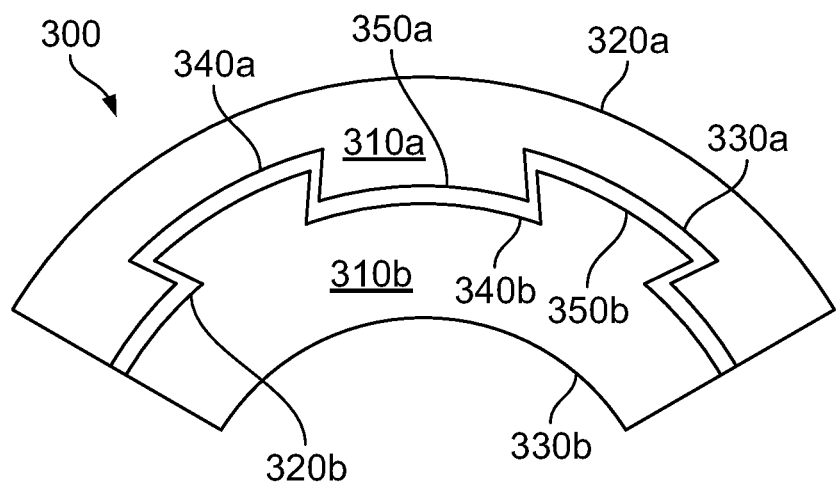
FIG. 4A is a partial cross-sectional view of an alternative embodiment of a rim assembly.

FIG. 4A is a partial cross-sectional view of an alternative embodiment of a rim assembly 300. The rim assembly 300 is substantially the same as the rim assemblies 200 described above, except for the differences detailed below.

The rim assembly 300 includes an outer rim 310a having an outer annular surface 320a and an inner surface 330a. The inner surface 330a of the outer rim has a first plurality of axial grooves 340a that define a first plurality of axial ridges 350a. The rim assembly 300 further includes an inner rim 310b having an outer surface 320b and an inner surface 330b. The outer surface 320b of the inner rim 310b has a second plurality of axial grooves 340b that define a second plurality of axial ridges 350b. The second plurality of axial grooves 340b have a cross-sectional geometry corresponding to a cross-sectional geometry of the first plurality of axial ridges 350a. Likewise, the second plurality of axial ridges 350b have a cross-sectional geometry corresponding to a cross-sectional geometry of the first plurality of axial grooves 340a.

In the illustrated embodiment, the sides of the axial ridges 350a,b extend in a non-radial direction such that each of the axial ridges 350a,b have a cross-section with a substantially trapezoidal shape. More specifically, the axial ridges 350a,b have a cross-section with a substantially inverted trapezoidal shape, such that the top of each ridge is wider than its base.

Figure 4B:
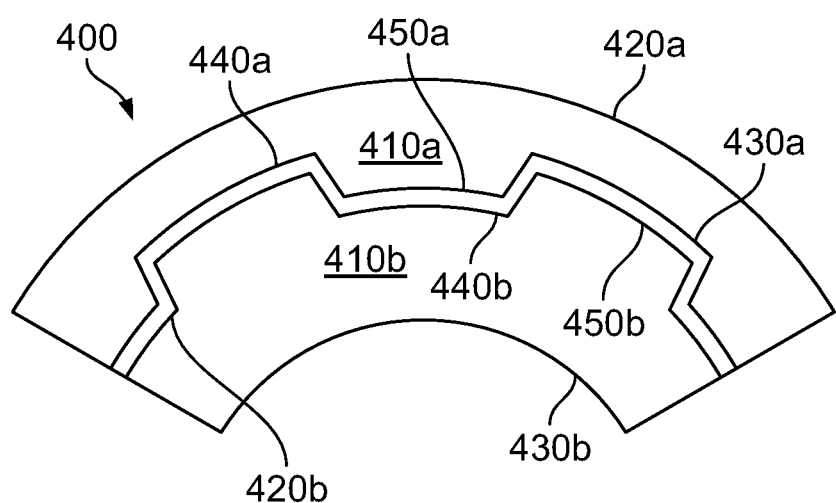
FIG. 4B is a partial cross-sectional view of another alternative embodiment of a rim assembly.

FIG. 4B is a partial cross-sectional view of another alternative embodiment of a rim assembly 400. The rim assembly 400 is substantially the same as the rim assemblies 200, 300 described above, except for the differences detailed below.

The rim assembly 400 includes an outer rim 410a having an outer annular surface 420a and an inner surface 430a. The inner surface 430a of the outer rim has a first plurality of axial grooves 440a that define a first plurality of axial ridges 450a. The rim assembly 400 further includes an inner rim 410b having an outer surface 420b and an inner surface 430b. The outer surface 420b of the inner rim 410b has a second plurality of axial grooves 440b that define a second plurality of axial ridges 450b. The second plurality of axial grooves 440b have a cross-sectional geometry corresponding to a cross-sectional geometry of the first plurality of axial ridges 450a. Likewise, the second plurality of axial ridges 450b have a cross-sectional geometry corresponding to a cross-sectional geometry of the first plurality of axial grooves 440a.

In the illustrated embodiment, the sides of the axial ridges 450a,b extend in a non-radial direction such that each of the axial ridges 450a,b have a cross-section with a substantially trapezoidal shape. More specifically, the axial ridges 450a,b have a cross-section with an upright trapezoidal shape, such that the base of each ridge is wider than its top.

Figure 4C:
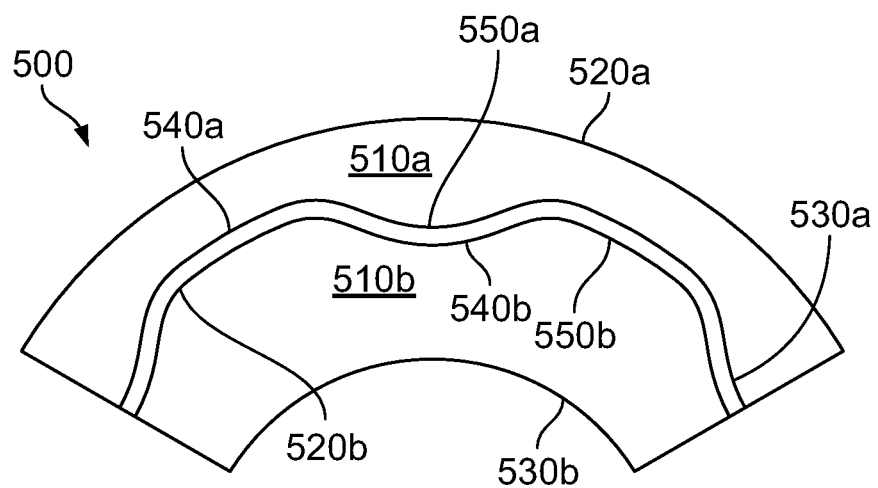
FIG. 4C is a partial cross-sectional view of yet another alternative embodiment of a rim assembly.

FIG. 4C is a partial cross-sectional view of yet another alternative embodiment of a rim assembly 500. The rim assembly 500 is substantially the same as the rim assemblies 200, 300, 400 described above, except for the differences detailed below.

The rim assembly 500 includes an outer rim 510a having an outer annular surface 520a and an inner surface 530a. The inner surface 530a of the outer rim has a first plurality of axial grooves 540a that define a first plurality of axial ridges 550a. The rim assembly 500 further includes an inner rim 510b having an outer surface 520b and an inner surface 530b. The outer surface 520b of the inner rim 510b has a second plurality of axial grooves 540b that define a second plurality of axial ridges 550a. Likewise, the second plurality of axial ridges 550b have a cross-sectional geometry corresponding to a cross-sectional geometry of the first plurality of axial grooves 540a. The second plurality of axial grooves 540b have a cross-sectional geometry corresponding to a cross-sectional geometry of the first plurality of axial ridges 550b. In the illustrated embodiment, the axial ridges 550a,b have a rounded cross-sectional shape.

Figure 4D:
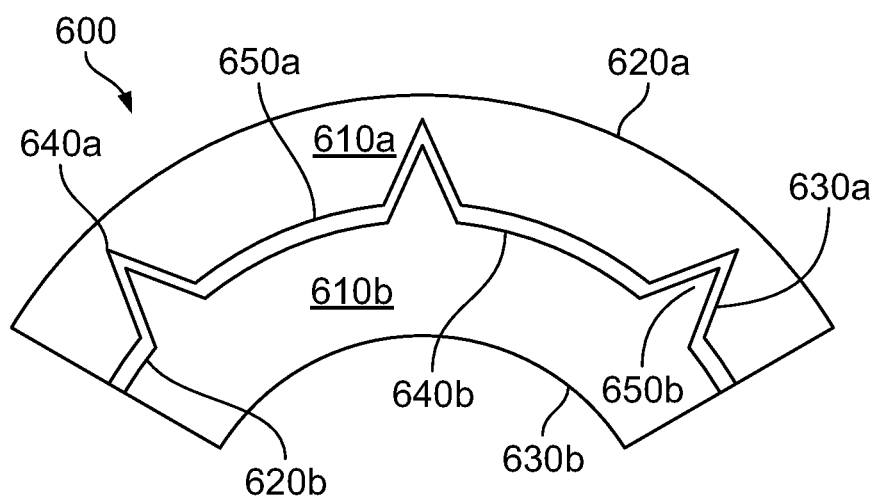
FIG. 4D is a partial cross-sectional view of still another alternative embodiment of a rim assembly.

FIG. 4D is a partial cross-sectional view of still another alternative embodiment of a rim assembly 600. The rim assembly 600 is substantially the same as the rim assemblies 200, 300, 400, 500 described above, except for the differences detailed below.

The rim assembly 600 includes an outer rim 610a having an outer annular surface 620a and an inner surface 630a. The inner surface 630a of the outer rim has a first plurality of axial grooves 640a that define a first plurality of axial ridges 650a. The rim assembly 600 further includes an inner rim 610b having an outer surface 620b and an inner surface 630b. The outer surface 620b of the inner rim 610b has a second plurality of axial grooves 640b that define a second plurality of axial ridges 650a. Likewise, the second plurality of axial ridges 650b have a cross-sectional geometry corresponding to a cross-sectional geometry of the first plurality of axial grooves 640a. The second plurality of axial grooves 640b have a cross-sectional geometry corresponding to a cross-sectional geometry of the first plurality of axial ridges 650b. In the illustrated embodiment, the axial ridges 650a,b have a triangular shape.

The examples shown in FIGS. 4A-D are not intended to be limiting. It should be understood that the axial ridges may have cross-sections of any geometric shape. Moreover, the axial ridges may vary in size or shape on the same rim component. For example, an alternating series of trapezoidal and triangular ridges may be employed.

Figure 5:
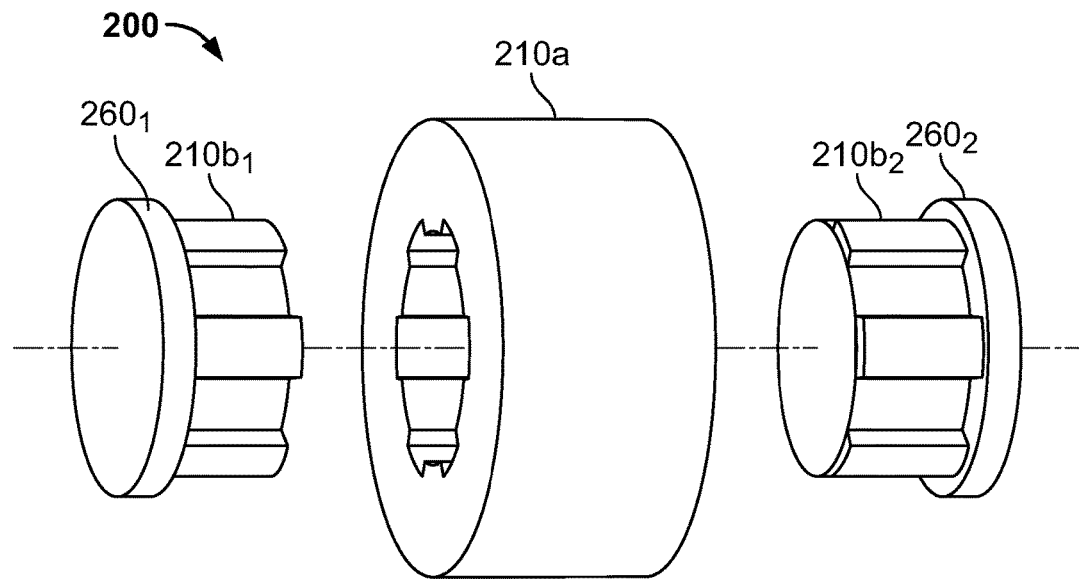
FIG. 5 is an exploded perspective view of the components of the rim assembly of FIG. 3.

FIG. 5 is an exploded perspective view of the components of the rim assembly 200 of FIG. 3. In this embodiment, the inner rim component 210b is a split rim component, having a left annular component $210b_1$ and a right annular component $210b_2$. The left annular component $210b_1$ has a left flange $260_1$ that contacts a left side of the outer rim 210a. Similarly, the right annular component $210b_2$ has a right flange $260_2$ that contacts a right side of the outer rim 210a.

The left annular component $210b_1$ may be secured to the right annular component $210b_1$ in a variety of different ways. In one embodiment, an internal end of the left annular component $210b_1$ is bolted to an internal end of the right annular component $210b_1$. In another embodiment, the left flange $260_1$ is bolted to the left side of the outer rim 210a, and the right flange $260_2$ is bolted to the right side of the outer rim 210a. In one such embodiment, the bolts extend completely through the outer rim 210a, such that the left flange $260_1$ is bolted to the right flange $260_2$.

When the rim assembly 200 is assembled, the flanges $260_1$, $260_2$ prevent the outer rim component 210a from moving axially relative to the inner rim component 210b. In an alternative embodiment (not shown), the inner rim components do not have flanges. Instead, discs or other securing elements are secured to both the inner rim components and the outer rim component.

Figure 6:
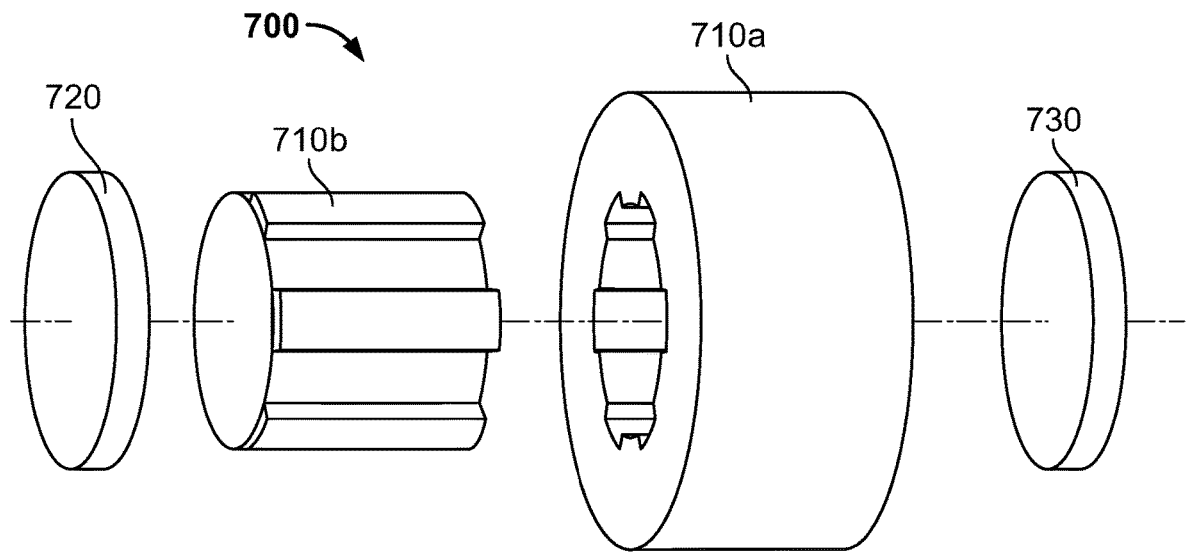
FIG. 6 is an exploded perspective view of the components of an alternative embodiment of a rim assembly.

FIG. 6 is an exploded perspective view of the components of an alternative embodiment of a rim assembly 700 having an outer rim component 710*a* and an inner rim component 710*b*. In this embodiment, the inner rim component 710*b* is a single component. The assembly 700 further includes a left disc 720 that is secured to both the left side of the inner rim component 720*b* and the left side of the outer rim 710*a*. Similarly, a right disc 730 is secured to both the right sides of the inner rim component 720*b* and the right side of the outer rim 710*a*.

When the rim assembly 700 is assembled, the discs 720, 730 prevent the outer rim component 710*a* from moving axially relative to the inner rim component 710*b*. In an alternative embodiment (not shown), one end of the inner rim component 710*b* has a flange and a single disc is employed at the opposite end. In other embodiments, securing elements other than discs are employed.

In the embodiments shown in FIGS. 5 and 6, all of the ridges and grooves on the inner and outer rim components extend in axial directions. In alternative embodiments (not shown), the ridges and grooves may be spiraled or helical shaped. Such grooves and ridges may be referred to as "rifled" grooves.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire and rim assembly comprising:
    a non-pneumatic tire including:
        an annular inner ring having an axis of rotation, wherein the annular inner ring has a smooth inner surface;
        an annular outer ring;
        support structure extending between the annular inner ring and the annular outer ring;
    a rim assembly including:
        an outer rim having an outer annular surface and an inner surface,
            wherein the outer annular surface of the outer rim is a smooth surface, and
            wherein the inner surface of the outer rim has a first plurality of axial grooves that define a first plurality of axial ridges; and
        an inner rim having an outer surface,
            wherein the outer surface of the inner rim has a second plurality of axial grooves that define a second plurality of axial ridges,
            wherein the second plurality of axial grooves have a cross-sectional geometry corresponding to a cross-sectional geometry of the first plurality of axial ridges,
            wherein the second plurality of axial ridges have a cross-sectional geometry corresponding to a cross-sectional geometry of the first plurality of axial grooves,
            wherein the inner rim includes a left annular component and a right annular component,
            wherein the left annular component has a left flange bolted to a left side of the outer rim, and
            wherein the right annular component has a right flange bolted to a right side of the outer rim.

2. The non-pneumatic tire and rim assembly of claim 1, further comprising an adhesive connecting the outer annular surface of the outer rim to the annular inner ring of the non-pneumatic tire.

3. The non-pneumatic tire and rim assembly of claim 1, wherein the outer rim is constructed of a first polymeric material, and wherein the non-pneumatic tire is constructed from a second polymeric material different from the first polymeric material.

4. The non-pneumatic tire and rim assembly of claim 1, wherein the non-pneumatic tire is constructed of a first material having a first modulus, and wherein the outer rim is constructed of a second material having a second modulus higher than the first modulus.

5. The non-pneumatic tire and rim assembly of claim 1, wherein the inner rim is constructed of metal.

6. The non-pneumatic tire and rim assembly of claim 1, wherein the annular inner ring of the non-pneumatic tire has an inner surface with a first diameter, and wherein the outer annular surface of the outer rim has a second diameter.

7. The non-pneumatic tire and rim assembly of claim 6, wherein the first diameter is equal to the second diameter.

8. A method of assembling a tire and rim assembly, the method comprising the steps of:
    providing a tire having an annular outer tire surface that defines an outer diameter and an annular inner tire surface that is a smooth surface and defines an inner diameter;
    providing an outer rim having an outer annular surface that is a smooth surface and an inner surface defined by a first plurality of axial ridges and a first plurality of axial grooves;
    providing a split inner rim having a second outer rim surface defined by a second plurality of axial ridges and a second plurality of axial grooves, and further having a left annular component with a left flange and a right annular component with a right flange;
    affixing the outer annular surface of the outer rim to the annular inner ring of the tire;
    aligning the second plurality of axial ridges of the left annular component and the right annular component of the split inner rim with the first plurality of axial grooves of the outer rim;
    inserting the left annular component into the outer rim;
    bolting the left flange of the left annular component to a left side of the outer rim;

inserting the right annular component into the outer rim; and bolting the right flange of the right annular component to a right side of the outer rim.

9. The method of claim 8, wherein the step of affixing the outer annular surface of the outer rim to the annular inner ring of the tire includes applying adhesive to the outer annular surface of the outer rim.

10. The method of claim 8, wherein the step of affixing the outer annular surface of the outer rim to the annular inner ring of the tire includes applying adhesive to the annular inner ring of the tire.

11. The method of claim 9, wherein the step of affixing the outer annular surface of the outer rim to the annular inner ring of the tire includes curing the non-pneumatic tire and the outer rim.

12. The method of claim 8, wherein the step of inserting the left annular component into the outer rim includes inserting the left annular component into the outer rim without applying adhesive to either of the outer rim or the left annular component.

13. A rim assembly for a tire, the rim assembly comprising:
an outer rim having an outer annular surface and an inner surface,
wherein the outer annular surface of the outer rim is a smooth surface, and
wherein the inner surface of the outer rim has a first plurality of axial grooves that define a first plurality of axial ridges; and
an inner rim having an outer surface,
wherein the outer surface of the inner rim has a second plurality of axial grooves that define a second plurality of axial ridges,
wherein the second plurality of axial grooves have a cross-sectional geometry corresponding to a cross-sectional geometry of the first plurality of axial ridges,
wherein the second plurality of axial ridges have a cross-sectional geometry corresponding to a cross-sectional geometry of the first plurality of axial grooves,
wherein the inner rim includes a left annular component and a right annular component,
wherein the left annular component has a left flange bolted to a left side of the outer rim, and
wherein the right annular component has a right flange bolted to a right side of the outer rim.

14. The rim assembly of claim 13, wherein the outer rim is constructed of a first material, and wherein the inner rim is constructed from a second material different from the first material.

* * * * *